R. ADLER.
ACCOUNT RECEPTACLE.
APPLICATION FILED DEC. 11, 1912.
1,086,341.
Patented Feb. 10, 1914.
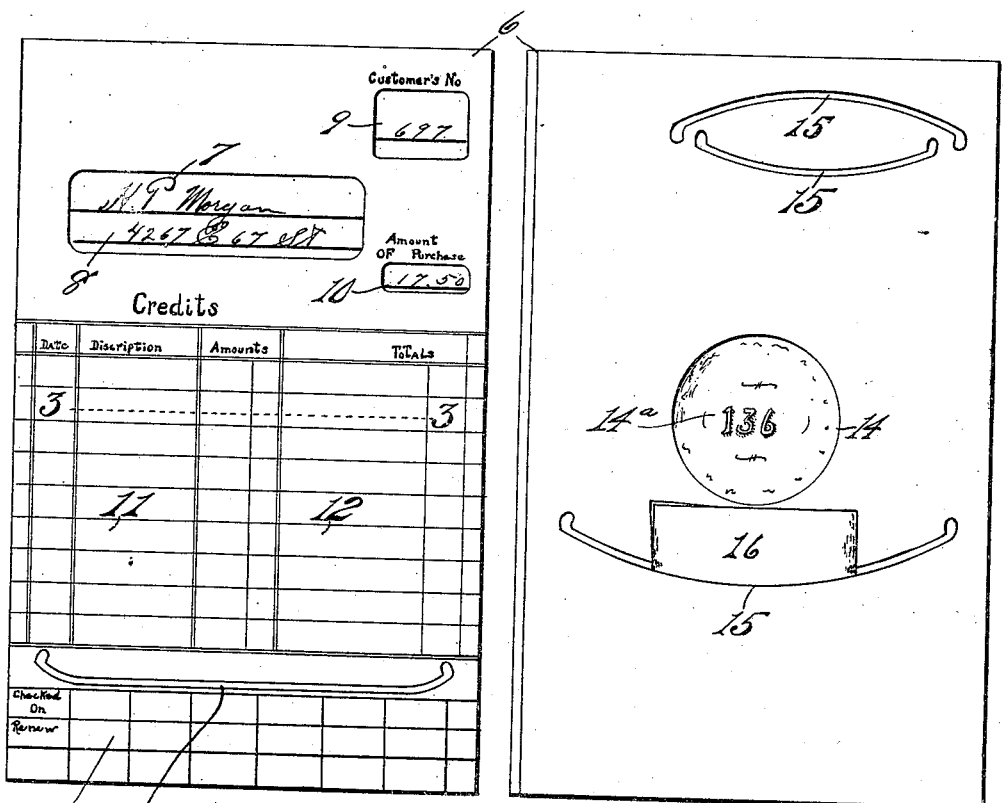
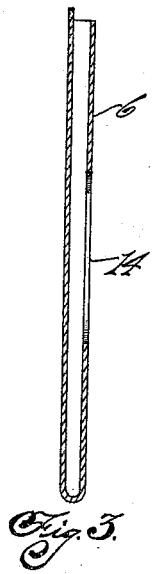
Witnesses
F. L. Richey
Gertrude M. Werner.
Inventor
Richard Adler.
By John A. Bommhardt
Attorney

UNITED STATES PATENT OFFICE.

RICHARD ADLER, OF CLEVELAND, OHIO.

ACCOUNT-RECEPTACLE.

1,086,341.  Specification of Letters Patent.  Patented Feb. 10, 1914.

Application filed December 11, 1912. Serial No. 736,076.

*To all whom it may concern:*

Be it known that I, RICHARD ADLER, a subject of the Emperor of Germany, residing at Cleveland, in the county of Cuyahoga and State of Ohio, have invented certain new and useful Improvements in Account-Receptacles, of which the following is a specification.

This invention relates to account receptacles or files, and is particularly adapted for the use of business houses doing a credit business.

The object of the invention is to provide a system to improve or supersede present methods of keeping accounts, particularly such methods employed in connection with sales slips made out by the sales people.

The present invention avoids the necessity for transferring various items to books or cards and for posting cash or other credit.

These and other desirable objects are effected by the use of an envelop or receptacle of special construction, adapted to receive the sales slips and credit checks or memorandums, said receptacle having openings through which the name of the customer to whom it relates, and whose slips are placed therein, is exposed, as well as the customer's number and the total amount of the purchase. The envelop or receptacle also contains, on the front thereof, a ledger or account ruling, to which the debits and credits are transferred, whereby the state of the account can readily be seen. The back of the envelop is also preferably provided with an opening to expose a cashier's stamp on the slips inclosed, as well as slits forming clips to hold cash or other credit checks or vouchers, to prevent the same dropping accidentally from the envelop. These envelops are filed in alphabetical or other order, and form a complete ledger or account file for the use of the bookkeeper.

The invention is illustrated in the accompanying drawing in which—

Figure 1 is a face view of one of the receptacles. Fig. 2 is a back view. Fig. 3 is a cross section on the line 3—3 of Fig. 1.

The envelop or receptacle may be constructed of any suitable material, preferably paper, and it may be in the form of a simple envelop as shown or with gusset edges to permit expansion to hold a large number of slips. The envelop may be open at the side, as shown, or at the top or bottom, to receive the slips. The front face of the envelop has an opening 7 of sufficient size to expose therethrough the name of the customer appearing on the ordinary sales slips 8 which are placed within the envelop. The front also contains an opening 9 to expose the customer's number appearing on the slip, as well as an opening 10 to expose the total of the sale on that slip. These openings are located at the upper end of the envelop. I also provide a slit 17 at lower front end of the envelop for the purpose of placing therein C. O. D. cash checks or other receipts.

The face of the envelop is ruled to provide spaces 11 for the date, description and amounts of credits, and spaces 12 for the totals of the debits or sales slips, and, if desired, spaces 13 at the bottom to receive remarks or dates when the account is checked or audited. The back of the envelop is provided with an opening 14 through which is exposed a cashier's or inspector's stamp 14ª or the like appearing on the back of the sales slips. I also make curved slits 15 in the back of the envelop in which credit slips or checks 16 may be engaged, when they are placed in the envelop, by slipping one edge of said credit checks into the slits, or under the tongues produced by said slits. The envelop will preferably be made of stiff paper, and the engagement of the checks in these slits will assist in holding the checks in place in the envelop and will prevent accidental dislodgment thereof which might occur if the checks were placed loosely in the envelop, said checks being ordinarily of comparatively small size.

One of the receptacles will be provided for each customer, and when the sales slips are sent to the office of the business house the bookkeeper writes the totals of the account in the upper right hand corner of the sales slip so that it will be exposed through the opening 10 of the envelop, and the bookkeeper also posts the credits to the column spaces 11, and enters balance due on the account in column space 12, and the sales slips and credit checks are retained in the receptacle until the account is closed, after which it can be taken out of the file and put away permanently. No other books or cards are necessary, and the bookkeeping in credit houses especially will be much simplified by the means indicated Other advantages will be apparent to those familiar with modern account systems.

What I claim is:

1. A receptacle designed to contain sales slips on which appear a customer's name and a debit amount, comprising an envelop formed in the upper half of its front face with openings registering with such name and amount, whereby the account elements of the slip are exposed.

2. A receptacle designed to contain sales slips on which appear account data including a customer's name and a debit amount, comprising an envelop formed in the upper half of its front face with a plurality of openings registering with such data, including such name and amount, whereby the account elements of the slip are exposed.

3. A receptacle designed to contain sales slips on which appear a customer's name and a debit amount, comprising an envelop formed in the upper half of its front face with openings registering with such name and amount, whereby the account elements of the slip are exposed, said envelop being provided on its front face and below said openings with an account form.

4. A receptacle designed to contain sales slips on which appear a customer's name and a debit amount, comprising an envelop formed in the upper half of its front face with openings registering with such name and amount, whereby the account elements of the slip are exposed, said envelop being provided with one or more slots adapted to hold and expose checks or the like.

5. A receptacle designed to contain sales slips on which appear a customer's name and a debit amount, comprising an envelop formed in the upper half of its front face with openings registering with such name and amount, whereby the account elements of the slip are exposed, said envelop being provided on its front face and below said openings with an account form, said envelop being also provided with one or more slots adapted to hold and expose checks or the like.

6. A receptacle designed to contain sales slips on which appear a customer's name and a debit amount, comprising an envelop having its front face open in registration with such name and amount, whereby the account elements of the slip are exposed, said envelop also having in its front face a slot adapted to hold and expose checks or the like.

7. A receptacle designed to contain sales slips on which appear a customer's name and address, comprising an envelop having its front face open in registration with such name and address, said envelop being provided on its front face with an account form.

8. A receptacle designed to contain sales slips on which appear a customer's name and address, comprising an envelop formed in the upper half of its front face with an opening registering with said name and address, said envelop being provided on its front face below said opening with an account form.

9. A receptacle designed to contain sales slips on which appear a customer's name and address, comprising an envelop formed in the upper half of its front face with an opening registering with such name and address, said envelop being provided with one or more slots adapted to hold and expose checks or the like.

10. A receptacle designed to contain sales slips on which appear a customer's name and address, comprising an envelop formed in the upper half of its front face with an opening registering with such name and address, said envelop being provided on its front face below said opening with an account form and being also provided with one or more slots adapted to hold and expose checks or the like.

11. A receptacle designed to contain sales slips on which appear account data, including a customer's name and address, comprising an envelop formed in the upper half of its front face with openings registering with such data, including said name and address.

12. A receptacle designed to contain sales slips on which appear account data, including a customer's name and address, comprising an envelop formed in the upper half of its front face with openings registering with such data, including said name and address, said envelop being provided on its front face below said openings with an account form.

13. A receptacle designed to contain sales slips on which appear account data, including a customer's name and address, comprising an envelop formed in the upper half of its front face with openings registering with such data, including said name and address, said envelop being provided on its front face below said openings with an account form and being also provided with one or more slots adapted to hold and expose checks or the like.

In testimony whereof, I do affix my signature in presence of two witnesses.

RICHARD ADLER.

Witnesses:
 JOHN A. BOMMHARDT,
 J. B. DANS.